United States Patent [19]
Kautt

[11] Patent Number: 5,105,534
[45] Date of Patent: Apr. 21, 1992

[54] INSTALLATION FOR ASSEMBLING MECHANICAL COMPONENT PARTS TO FORM A STRUCTURAL ASSEMBLY

[75] Inventor: M. Jean-Jacques Kautt, Strasbourg, France

[73] Assignee: Ferco International Usine de Ferrures de Batiment, Sarrebourg, France

[21] Appl. No.: 726,130

[22] Filed: Jul. 3, 1991

Related U.S. Application Data

[63] Continuation of Ser. No. 446,451, Dec. 5, 1989, abandoned.

[30] Foreign Application Priority Data

Dec. 14, 1988 [FR] France .................. 88 16450

[51] Int. Cl.⁵ .................................. B23P 21/00
[52] U.S. Cl. ........................... 29/783; 29/785; 29/786; 29/792; 29/794; 29/809; 29/821
[58] Field of Search ........... 29/430, 469, 771, 783, 29/785, 786, 787, 788, 791, 792, 793, 794, 795, 796, 809, 810, 821, 822

[56] References Cited

U.S. PATENT DOCUMENTS

| | | | |
|---|---|---|---|
| 3,088,198 | 5/1963 | Svenson | 29/785 X |
| 3,766,626 | 10/1973 | Mjos et al. | 29/783 X |
| 3,795,965 | 3/1974 | Sherman | 29/783 X |
| 3,797,096 | 3/1974 | Nilsson | 29/783 X |
| 4,209,898 | 7/1980 | Aoki et al. | 29/783 |
| 4,767,046 | 8/1988 | Kumagai et al. | 29/794 X |
| 4,870,749 | 10/1989 | Roy et al. | 29/809 X |

FOREIGN PATENT DOCUMENTS 0282427  3/1988 European Pat. Off.
2589933 11/1985 France.

OTHER PUBLICATIONS

Landis & Gyr-Mitteilungen, vol. 35, No. 1, 1988, pp. 2-6, Zug, CH; B. Aregger et al.
Machines Production, No. 200, May 2, 1978, pp. 13-18, Sofetec, FR.
Feinwerktechnik & Messtechnik, vol. 90, No. 6, Sep. 1982, pp. 71-72, Munich, DE; J. Gautschi et al.

Primary Examiner—Joseph M. Gorski
Attorney, Agent, or Firm—Fidelman & Wolffe

[57] ABSTRACT

An installation for the continuous assembly of complementary component parts of a structural assembly constituting a door or window espagnolette bolt operating mechanism includes a main assembly circuit comprising at least one conveyor adapted to be advanced in steps and components part support plates fixed to this conveyor. Feed lines convey the component parts from storage units to the assembly circuit. Take-up devices transfer component parts from the feed lines to the conveyor. Component part assembly devices are located downstream of these take-up devices in the direction of movement of the conveyor. The installation further comprises devices for controlling the positioning and assembly of the component parts on the respective support plates.

18 Claims, 1 Drawing Sheet

INSTALLATION FOR ASSEMBLING MECHANICAL COMPONENT PARTS TO FORM A STRUCTURAL ASSEMBLY

This application is a continuation of U.S. application Ser. No. 07/446,451 filed Dec. 5, 1989 and now abandoned.

BACKGROUND OF THE INVENTION

1. Field of the invention

The invention concerns an installation for assembling complementary component parts which combine to form a structural assembly, such as the mechanical components of a door or window espagnolette bolt operating mechanism.

2. Description of the prior art

Mechanical and electrical structural assemblies generally comprise individual component parts that are either pre-assembled into sub-assemblies that are subsequently put together or assembled to each other in succession to build up gradually the final structure. In the case of an espagnolette bolt operating mechanism, essentially comprising two half-shells (back and cover) enclosing components parts such as brackets, shafts, bushes, door-knob hole members, rods and plates, the usual practise is to fit these components together by hand and rivet them. Because these successive assembly operations are essentially manual, they result in high production costs given the large number of manipulations and the time wasted taking up, positioning and assembling the parts. What is more, the assembly time depends on the know-how and skill of the operator, leading to significant variations in the manufacturing cycles and quality, which compromises productivity and profitability. To consider this in more detail, the operative has to take up the first two component parts from receptacles in which components of each category are -.stored loose in bulk, fit them together by hand, insert them into a riveting device to join them together, check that this has been done correctly, take up a third part to join it to the first two, and so on.

These manipulations are time-consuming and fiddly because of their repetitive nature and soon lead to significant reductions in efficiency.

The invention is intended to remedy thee various disadvantages.

SUMMARY OF THE INVENTION

The present invention consists in an installation for the continuous assembly of complementary component parts of a structural assembly constituting a door or window espagnolette bolt operating mechanism, the installation comprising:
 a main assembly circuit comprising at least one conveyor adapted to be advanced in steps and component part support plates fixed to the at least one conveyor,
 feed lines adapted to convey component parts from storage units to the assembly circuit,
 take-up devices adapted to transfer component parts from the feed lines to the at least one conveyor,
 component part assembly means downstream of the take-up means in the direction of movement of the at least one conveyor, and
 means adapted to check the positioning and assembly of component parts on respective support plates.

In one preferred embodiment of the invention each feed line comprises a vibrating receptacle adapted to contain component parts of a specific kind and a distribution corridor tangential to the receptacle, the transverse plane of each corridor being aligned with a take-up device.

According to one advantageous characteristic of the invention, the take-up devices are piston-and-cylinder actuators and the piston of each actuator is provided with a component part holding head which comprises a twin jaw clamp and an actuator selectively operable to open and close the clamp.

According to another preferred characteristic of the invention, the installation comprises at least one branch feed line adapted to feed pre-assembled subassemblies to the main assembly circuit, the branch feed lines converging towards the reference axis and being interconnected with the main assembly circuit.

The invention makes it possible to assemble an operating mechanism continuously, completely, automatically, flexibly and in a controlled manner.

It enables the combination of automatic subassembly assembly stations with simple feed stations.

In the prior art, when operating mechanism subassemblies had to be assembled prior to final assembly of the operating mechanism component parts, the manufacturer might elect to use subcontractors with the attendant problems of quality, cost and deliveries, or to assemble the subassemblies himself, these two options being dependent on their specific characteristics as to their productivity. The invention solves the problem by providing a single automatic assembly line for assembling subassemblies and producing complete assemblies integrating such subassemblies. A single control, assembly and inspection process covers the entire cycle from the supply of individual component parts to the completion of the final product.

The usual approach entails automating a manual workstation, and possibly linking up a number of the resulting stations. The present invention is directed to automating the task rather than the workstation, as automating the workstation would require the presence of an operator to supervise or carry out the assembly work despite the automation. By automating the tasks the amount of valuable workshop space occupied by the automatic systems is reduced and all the automatic units are restricted to one or more assembly lines. This reduction in space requirements is an important factor in the development and the continuity of the tasks without interruptions for intermediate storage or resupply, so enabling productivity to be increased.

It is currently the received wisdom that automation creates new, dedicated and costly workstations. In addition to the necessity for manual maintenance and setting up, these machines are generally supervised by an operator, there being a prejudice against machines replacing the know-how of a person. This additional investment cost is evidently contraindicated if productivity is to be optimized.

With the present invention, on the other hand, the installation requires only one person to be in charge of it and one person to maintain it, this latter person usually working on more than one assembly line. Although the installation is designed to assemble a product in as near perfect a way as possible, there is provision for inspecting samples. For these further reasons productivity is optimized.

Other characteristics and advantages of the invention will emerge from the following description which refers to the single appended drawing which is a schematic representation of an installation in accordance with the invention showing a main assembly circuit and two branch lines feeding pre-assembled subassemblies.

DETAILED DESCRIPTION OF THE INVENTION

Figure 1:
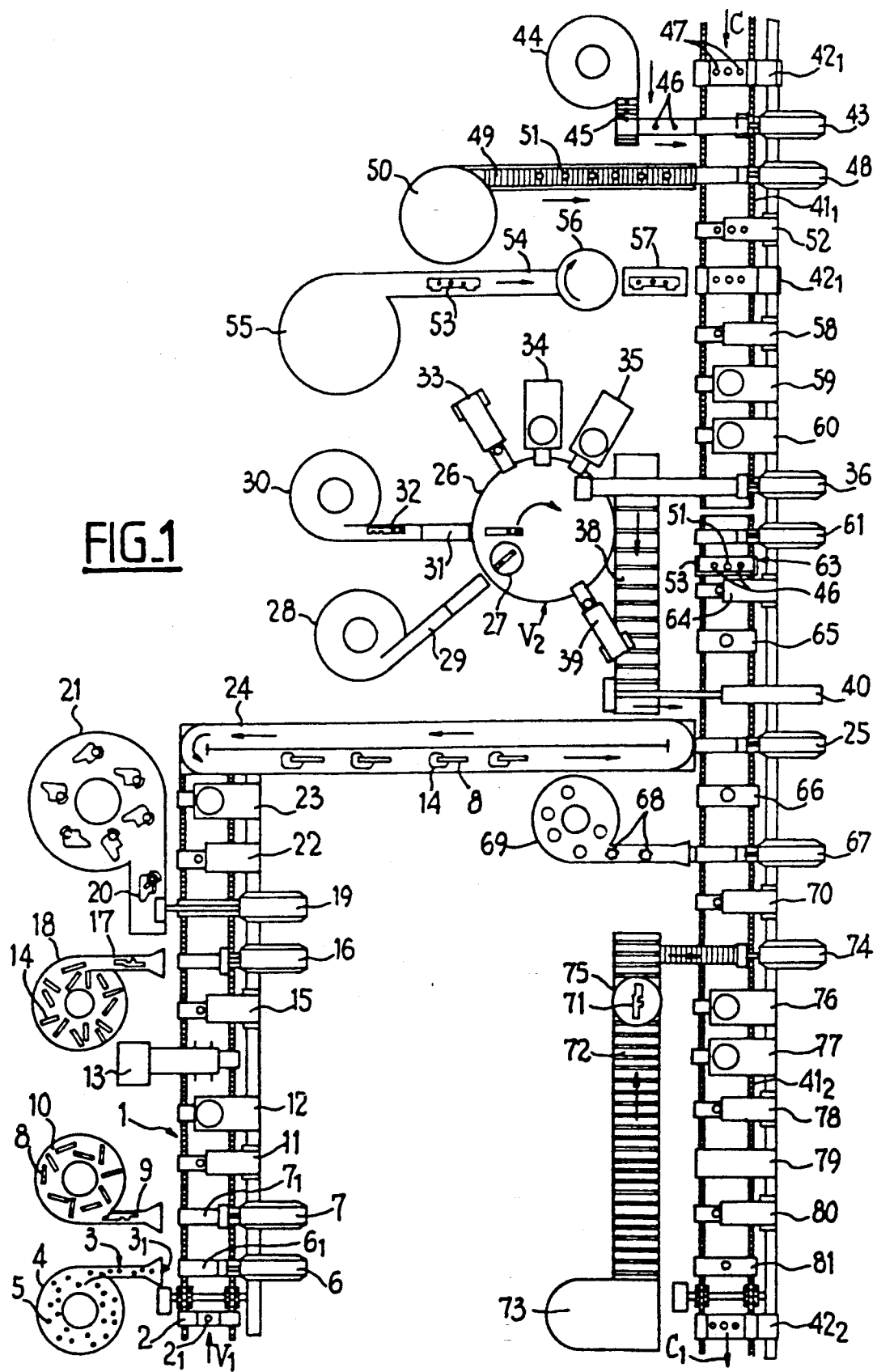

The essential object of the invention is to enable the continuous assembly without manual intervention of a structural unit which in this example is a door or window espagnolette bolt operating mechanism. An operating mechanism of this kind usually comprises two half-shelves forming the back and the cover of the operating mechanism and enclosing mechanical component parts including the rods, the toothed drive wheel, the door-knob hole member and its bracket and shaft and bushes enabling the two half-shells constituting the operating mechanism to be riveted together.

Although the following example relates to this specific case of an espagnolette bolt operating mechanism, a substantially comparable installation could, of course, be used for other purposes, for example for the continuous assembly of other structural units in the hardware industry, without departing from the scope of the invention.

As can be seen in the single figure, the installation essentially comprises a main assembly circuit C extending along a linear reference axis. Takeup, assembly and checking stations are spread along the length of the reference axis. The main circuit is fed by a number of feed lines disposed transversely to the linear reference axis C and by two branch lines $V_1$ and $V_2$ feeding pre-assembled subassemblies.

The line $V_1$ essentially comprises a chain conveyor 1 adapted to be advanced in steps and driven in a known way by an electric motor and drive sprocket wheels (not shown). Fixed to the conveyor at strictly regular intervals are support plates 2 adapted to receive component parts to be assembled. Fastened to the links of the chain, these plates are moved periodically through the distance equal to that between two consecutive stations of the installation. Starting from the end of the branch line $V_1$ and proceeding in the direction of the corresponding arrow, the support plate 2 is first fed by a first feed line 3 comprising a distribution corridor tangential to a magazine 4 which is in the form of a vibrating open receptacle containing a first category of component parts to be assembled, such as shafts 5, for example. Because the receptacle vibrates, the shafts are progressively fed into the distribution corridor 3 which is aligned with a take-up device 6 in the form of a piston-and-cylinder actuator the piston $6_1$ of which is transversely aligned with the distribution corridor 3. This actuator is a pneumatic actuator and its piston $6_1$ (shown retracted in the figure) can be deployed to lie over the end $3_1$ of the distribution corridor 3 in order to take up a part in order to feed it to the support plate 2 which in the mean time has moved forward one step and so is in the same vertical plane as the piston $6_1$. The part 5 is taken up by the piston $6_1$ which to this end comprises a holding head consisting in the usual way of a twin jaw clamp selectively operable to open or close. It closes onto the part 5 when the end of the piston $6_1$ is located over the distribution corridor 3. Holding on to the clamped part, it then retracts to the retracted position shown in the figure and then opens again to release the part and position it in a cell $2_1$ carried by the support plate 2.

When this first operation has been completed the conveyor 1 moves forward by a further step so that the support plate 2 carrying the part 5 is brought into the same vertical plane as the second take-up device 7. This takes up a second part 8 from the distribution corridor 9 of the magazine 10. The piston $7_1$ of the piston-and-cylinder actuator 7 operates in precisely the same way as the piston $6_1$ of the piston-and-cylinder actuator 6.

The purpose of this second take-up operation is to take up a part to place it on the assembly circuit consisting of the branch line $V_1$. When this operation is completed, the presence of the two parts 5 and 8 is verified in a station 11 on the chain conveyor 1. This station comprises two plunger type feelers in the form of two fingers accurately located in the same vertical plane as the parts carried by the plate 2 so that they encounter the parts as they are lowered and register their presence. The chain conveyor again moves forward by one step and the support plate 2 is thus brought to a first riveting station 12 where the parts 5 and 8 carried by the support plate 2 are assembled together. The riveting station comprises a gyroscopic head operating essentially on the end of the shaft 5 to assemble the parts together.

An overturning device 13 may be provided downstream of the riveting station 12 if the two component parts assembled together need to be rotated through 180° for further assembly, as is the case here. The overturning device 13 comprises a rotary head piston-and-cylinder actuator comprising holding means such as jaws capable of grasping the bracket on the support plate 2 and then turning through 180° before replacing the turned over bracket on its support plate. After this operation the conveyor 1 again moves forward one step to bring the support plate in line with a checking station 15 identical to the station 11.

When the checking operation has been carried out at the station 15 the chain conveyor 1 again advances by one step to bring the support plate 2 to a further take-up device 16 consisting of a piston-and-cylinder actuator with a holding head on the piston identical to the actuators 6 and 7. This actuator takes a door-knob hole member from the distribution corridor 17 of the magazine 18 to feed it to the assembly circuit $V_1$.

The chain conveyor again moves forward one step to bring the support plate 2 into line with a further take-up station 19 comparable to the stations 6, 7 and 16. This station is fed by the distribution corridor 20 from a magazine 21 containing a second bracket to be assembled to the previous three parts (shaft 5, bracket 8 and door-knob hole member 14). After being advanced by one further step, the support plate 2, now carrying four parts, is brought to a checking station 22 identical to the station 11 (plunger-feeler) and then to a riveting station 23 identical to the station 12.

The branch line $V_1$ is joined to the main assembly circuit C by a horizontally rotating transverse conveyor 24 on which the door-knob hole member 14 and the brackets are schematically represented. The conveyor 24 is aligned with a take-up device 25 on the main assembly circuit which operates in the same way as the stations 6, 7, 16 and 19.

The second branch feed line $V_2$ comprises a rotary table 26 on which are seven feed, checking, riveting and take-up stations at predetermined angular intervals.

The support plate 27 fixed to the rotary table 26 is first fed with toothed linking members by a vibrating magazine 28 with a tangential distribution corridor 29 aligned with the support plate 27. The vibrating magazine 30 feeds rack-rods 32 to the support plate 27 via the distribution corridor 31, the latter components being brought to the plate 27 by holding devices. Of course, the rotary table turns through an angle equal to that between two consecutive stations, the rack-rods 32 coupled to the plates fed by the magazine 28 being then brought to a checking (plunger-feeder) station 33 and thereafter to two consecutive riveting stations 34, 35 for assembling the rack-rod to the corresponding plate. When this double operation has been carried out the rotary table 36 turns by a further step so that the support plate 27 is aligned with a new take-up device 36 which takes up the resulting subassembly to transfer it to a transfer device 38 in the form of a chain conveyor moving in plane parallel to the main assembly circuit C. An additional checking station 39 is provided on the rotary table to verify that the subassembly has been taken up by the device 36 and that it is therefore no longer present on the plate 27 on the rotary table.

The conveyor 38 feeds the subassembly to a new take-up device 40 on the main assembly circuit C, this device comprising a pneumatic piston-and-cylinder actuator with a holding head which takes up the subassembly on the conveyor 28 and, when fully retracted, places it on the chain conveyor of the main assembly circuit.

In this way the two branch lines $V_1$ and $V_2$ auxiliary to the main assembly circuit C converge so as to interconnect their respective subassemblies in a predetermined order with the other subassembly carried by the main assembly circuit C.

The main assembly circuit C comprises, like the branch line $V_1$, an upstream chain conveyor $41_1$ and a downstream chain conveyor $41_2$ driven stepwise by two electric motors. These conveyors comprise respective support plates $42_1$ and $42_2$ fastened to the links of the chain $41_1$ and $41_2$ and fed selectively and progressively from the upstream side to the downstream side of each station along the main assembly circuit which runs along a linear reference axis.

The upstream position of the chain conveyor $41_1$ is at the height of the support plate $42_1$ and the same applies to the chain conveyor $41_2$ and the support plate $42_2$ (arrow $C_1$) Thus, following the support plate $42_1$ successively from the upstream to the downstream position, it is seen that it is first brought to a take-up member 43 in the form of a piston-and-cylinder actuator the piston of which carries a holding head comparable with the other holding devices along the assembly circuit. The take-up station 43 is fed by a vibrating magazine 44 with a distribution corridor 45 feeding two assembly bushes 46 to be received into orifices 47 in the support plate $42_1$. The jaws of the piston of the actuator 43 take up the two bushes 46 and the piston then retracts to a position above the assembly circuit C where it deposits the two bushes 46 in the orifices 47 in the support plate $42_1$.

When this second operation has been completed the conveyor moves forward one step to bring the support plate $42_1$ under the actuator 48 supplied by a feed line 49 linking the magazine 50 and the main assembly circuit. The piston of the actuator 48 is deployed and its twin jaw takes up a part such as a shaft 51. It is then retracted to place the shaft on the plate $42_1$ alongside the two bushes 46. The chain conveyor $41_1$ again advances by one step to bring the support plate $42_1$ into the same vertical plane as a checking station 52 which verifies that the two bushes 46 and the shaft 51 are actually present.

At this stage the conveyor is again advanced by one step to receive the cover 53 of the espagnolette bolt operating mechanism which is fed transversely to the main assembly circuit by a distribution corridor 54 from a magazine 55. At the forward end of this corridor is an orientation head 56 for checking the orientation of the cover 53 by a known method using a cell. The covers are stored loose in bulk in the magazine 55. The vibration feeds them into the distribution corridor 54 where their orientation is random, the magazine having no means of orienting them the right way round. It is therefore necessary for an orientation head to verify if each cover is the right way round and if not to pivot it horizontally through 180° so that a cover the wrong way round is then the right way round. The role of the orientation head is therefore to ensure that the cover is placed on the support plate $42_1$ the right way round. The orientation head 56 is followed by a positioning unit 57 which feeds the operating mechanism cover to the support plate $42_1$ facing this positioning unit.

The support plate $42_1$ is then moved to a checking station 58 and then in succession to two riveting stations 59, 60 which successively rivet the bushes and shaft supplied by the feed lines 45, 49 to the operating mechanism cover 53.

After this double assembly operation the plate $42_1$ is moved to a turnover station $6_1$ in the form of a pneumatic piston-and-cylinder actuator the piston of which comprises a rotary head which takes up the operating mechanism cover 53 assembled to the shafts and the bush and turns it through 180° as it feeds it to another chain conveyor $41_2$ (separate to the conveyor $41_1$) in the position shown at 63. Note at this station the presence of the operating mechanism cover 53 and the two bushes and shaft 46, 51 on a plate $42_2$ of the conveyor $41_2$. When the operating mechanism cover 53 has been turned over in this way the conveyor $41_2$ again advances by one step to bring the subassembly 53, 46, 51 to a further checking station 64 and then to a lubrication station 65 where the assembled bushes and shafts are lubricated.

It is at this stage that the subassemblies from the branch lines $V_1$, $V_2$ are interconnected, being taken up by the respective piston-and-cylinder actuators 40 and 25 respectively linked to the conveyors 28 and 34. In this way the plate and rack-rod subassembly 32 is moved from the conveyor 38 to the main assembly circuit by the head of the actuator 40 and placed in the operating mechanism cover 53 which has reached this station. The door-knob hole member and brackets subassembly from the branch line $V_1$ is then moved onto the main assembly circuit by the actuator 25 the holding head of which takes up the subassembly to place it in the operating mechanism cover 53 which has reached this station. After further lubrication at station 66 the operating mechanism cover 53 is brought to the take-up station 67 fed by a feed line 68 from a vibrating magazine 69. This magazine supplies toothed wheels which are taken up by the holding head of the actuator 67 to be transferred from the distribution corridor 68 to the main assembly circuit. The conveyor again moves forward by one step to a station 70 for verifying the presence of the toothed wheels downstream of the take-up device 67.

At this stage there remains only one part to be attached to the previous three subassemblies that have now been grouped together. This part is the back 71 of the operating mechanism which is fed to the main assembly circuit by an independent conveyor 72 parallel to said circuit. This autonomous feed line comprises a distribution corridor 72 leading from a magazine 73 in which are stored the operating mechanism backs 71 which are taken up from the corridor 72 to be moved onto the main assembly circuit by a holding device 75 comprising a piston-and-cylinder actuator with a holding head similar to the other holding devices previously described. Like the feed line 54 feeding the operating mechanism covers 53, the distribution corridor 72 has a rotating orientation head 75 for turning round each operating mechanism back if it is the wrong way round. A cell senses the direction of movement of the operating mechanism back and if this is incorrect the rotary table turns 180° in a horizontal plane to position the part correctly.

The operating mechanism back taken up by the actuator 74 is at this stage placed on the subassembly formed by the operating mechanism cover coupled to the other two subassemblies (plate and rack-rod and door-knob hole member and brackets), the shafts and bushes 51 and 46 passing through holes in the operating mechanism back 71 to project slightly so that their ends can be riveted over for the final assembly of the espagnolette bolt operating mechanism. These riveting operations are carried out by the respective stations 76 and 77, the first station riveting over the ends of the two bushes 46 and the second riveting over the end of the shaft 51.

The espagnolette bolt operating mechanism assembled in this way is then fed to a station 78 for checking the screwthread of the bushes 46 which incorporate a screwthread for subsequent attachment of the espagnolette bolt operating mechanism to the opening panel of the door or window. After a further check on the positioning of the operating mechanism at a station 79 and a subsequent check that it is functioning correctly at a station 80 the operating mechanism is ejected at the station 81 into a receiving bin and the support plate 42$_2$ is then available to be remounted on the circuit 41$_2$.

The installation as described above functions continuously without any manual intervention and the operating cycle is controlled by a computer-based control system using software that is not an integral part of the invention. In this way each phase of the cycle is synchronised with the forward movement of the conveyors and with the operation of the take-up, checking and riveting devices. All the take-up actuators are pneumatic piston-and-cylinder type actuators and are slaved to the central control electronics. The conveyors are driven stepwise in the usual way by electric motors. The holding heads and the take-up devices have not been described in detail because piston-and-cylinder actuators where the piston is provided with a head comprising a take-up jaw are known in themselves, although employed to other ends. The checking devices comprise pneumatic heads provided with plunger-feelers. The riveting units are operated by electric motors. The novelty of the invention resides in the previously undisclosed combination of the various distribution, take-up, assembly and feed means for the various component parts to be joined together without any manual intervention by means of a preprogrammed computer-controlled cycle.

This installation enables continuous assembly of operating mechanisms at a strictly controlled rate without being in any way limited to the dimensional characteristics and technical features of this family of espagnolette bolt operating mechanisms.

Of course, an installation of this kind could be used for assembling other structural assemblies as it would suffice in this case simply to change the holding heads of the take-up devices and the positioning of the plunger-feelers without changing the principle of the invention in any way, provided that the structural units are small units with components parts of small size so that they can be fed to the feed lines by vibration alone.

What is claimed is:

1. An installation for the continuous and automated assemble of complementary component parts of a structural assembly constituting a door or window espagnolette bolt operating mechanism the installation comprising:
   (a) a main assembly circuit comprising at least one conveyor adapted to be advanced in steps from an upstream end to a downstream end of said main assembly circuit and component part support plates fixed to said at least one conveyor;
   (b) first main feed means for conveying bushes, a first shaft and front cover of aid espagnolette bolt operating mechanism from storage units to a support plate on said main assembly circuit;
   (c) first assembly means for automatically assembling said bushes and said first shaft to said front cover to form a first subassembly, said first assembly means being located along said main assembly circuit downstream of said first main feed means;
   (d) second main feed means for conveying a rack rod subassembly to said main assembly circuit at a location downstream of said first assembly means;
   (e) first positioning means for positioning said rack rod subassembly in relation to said first subassembly, said first positioning means locating along said main assembly circuit near said second main feed means;
   (f) second assembly means for automatically assembling a second shaft, a bracket and a door knob hole member of said espagnoletto bolt operating mechanism to form a third subassembly;
   (g) third main feed means for conveying said third subassembly to said main assembly circuit at a location downstream of said first positioning means;
   (h) second positioning means for positioning said third subassembly in relation to said first and rack rod subassemblies, said second positioning means located along said main assembly circuit near said third main feed means;
   (i) fourth main feed means for conveying a toothed wheel to said main assembly circuit downstream of said second positioning means;
   (j) third positioning means for positioning said toothed wheel in relation to said first, second rack rod subassemblies along said main assembly circuit near said fourth main feed means;
   (k) fifth main feed means for conveying a back cover to said main circuit and fourth positioning means for positioning said back cover in relation to said first, rack rod and third subassemblies and said toothed wheel, each of said fifth main feed means and said fourth positioning means being located along said main circuit downstream of said third positioning means; and (l) third assembly means for automatically assembling said back cover to said first, rack rod and third subassemblies and said tooth wheel and checking means for checking the position of san assembled espangolette bolt operating mechanism on a support plate along said main assembly circuit at a location downstream of said fifth main feed means.

2. Installation according to claim 21 wherein said main assembly circuit extends along a linear reference axis and said first, second and third main feed means feed component parts transversely to said reference axis.

3. Installation according to claim 2, wherein said second mainfeed means comprises at least one branch feed line adapted to feed assembled subassemblies to said main assembly circuit, each of said at least one branch feed lines converging towards said reference axis and being interconnected with said main assembly circuit.

4. Installation according to claim 3 wherein said at least one branch feed line comprises a table adapted to rotate in steps, means for feeding a rack rod and a plate to said table, take-up devices for transferring said plate and said rack rod from said means for feeding to said table, means for assembling said rack rod and plate to form said rack rod assembly, a conveyor linking said table to said main assembly circuit and take-up means for transferring said rack rod subassembly from said table to said conveyor and from said conveyor to said main assembly circuit.

5. Installation according to claim 3 wherein said main assembly circuit and said branch feed lines each comprise stepped type chain conveyors.

6. Installation according to claim 3 wherein said second assembly means is located along a second branch feed line which comprises a first conveyor, said third main feed means including a second conveyor which connects said first conveyor and said main circuit assembly, said second branch feed line comprising means for transversely feeding said second shaft, said bracket and said door knob hole member to said first conveyor.

7. Installation according to claim 1 wherein said first main feed means comprises vibrating receptacles adapted to contain component parts and a distribution corridor tangential to each of said receptacles, a transverse plane of each corridor being aligned with a take-up means for transferring the component parts to the main assembly circuit.

8. Installation according to claim 3 wherein said take-up means comprise piston-and-cylinder actuators and the piston of each actuator is provided with a component part holding head.

9. Installation according to claim 8 wherein each holding head comprises a twin jaw clamp and an actuator selectively operable to open and close said clamp.

10. Installation according to claim 1 wherein each of said first and third assembly means comprises riveting units disposed along said main assembly circuit.

11. Installation according to claim 6 wherein said riveting units include an electric motor which drives them.

12. Installation according to claim 1 comprising a computer-based control system.

13. Installation according to claim 1 wherein said checking means comprises pneumatic heads carrying plunger-feelers.

14. Installation according to claim 1 comprising means for turning parts over and means for turning parts round by horizontal pivoting through 180°.

15. Installation according to claim 11 wherein said means for turning parts over comprise rotary holding heads and actuators therefor.

16. Installation according to claim 14, wherein said means for turning parts round comprise orientation heads and control cells therefor.

17. Installation according to claim 1 comprising means for lubricating said structural assembly.

18. Installation according to claim 1 comprising at the end of said circuit means for checking that said structural assembly is functioning correctly.

* * * * *